W. Campbell,
Band Pulley.

N° 11,848.  Patented Oct. 24, 1854.

AM. PHOTO-LITHO. CO. N.Y. (OSBORNE'S PROCESS)

UNITED STATES PATENT OFFICE.

WM. CAMPBELL, OF WEST PHILADELPHIA, PENNSYLVANIA, ASSIGNOR TO WM. CAMPBELL AND E. W. SHIPPEN.

BEARING FOR LOOSE PULLEY.

Specification of Letters Patent No. 11,848, dated October 24, 1854.

*To all whom it may concern:*

Be it known that I, WILLIAM CAMPBELL, of West Philadelphia, in the county of Philadelphia and State of Pennsylvania, have invented a new and Improved Loose or Suspension Pulley and Hanger with an axis whereby a loose pulley or pulleys may revolve independent of the shaft, which pulley and hanger I place beside a driving pulley or a line shaft, or any intermediate shaft bearing the same relation to a lathe or other machine to be detached, as a line shaft, whereby I obviate the continued wear attendant upon the ordinary loose pulley, shafting, and belts when a lathe, loom, or other machine is not in actual operation, beside which I cause a saving of oil and the power of the engine. My invention also obviates the necessity of throwing belts off of the pulley in order to prevent the wear of machinery while the engine is in motion and the danger to life and limb in putting them on; and I do hereby declare that the following is a full and exact description thereof, reference being had to the accompanying drawings and to the letters of reference marked thereon, making a part of this specification.

Figure 1:
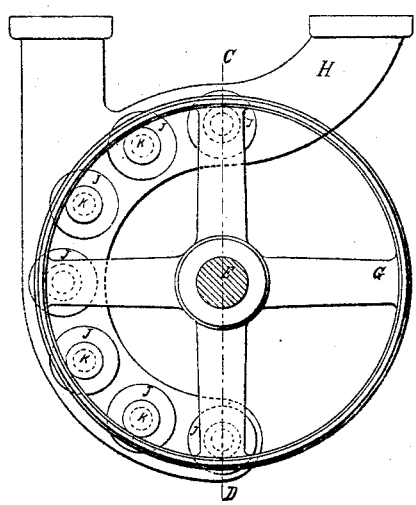
Figure 3:
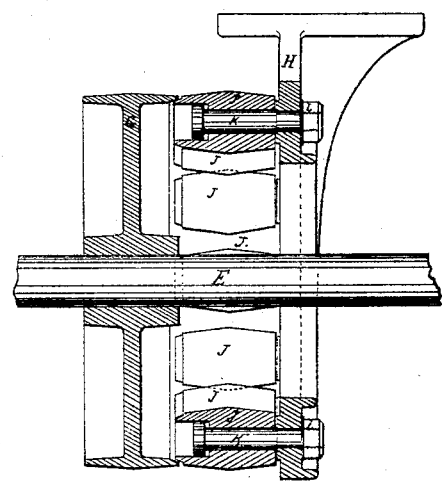
Figure 2:
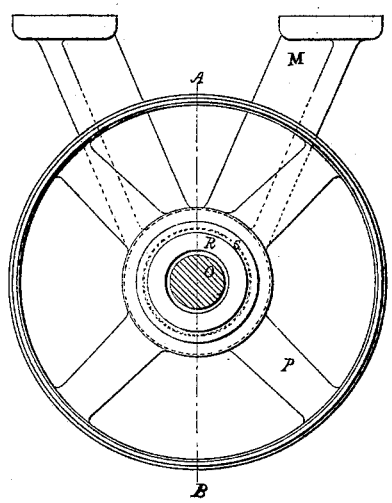
Figure 4:
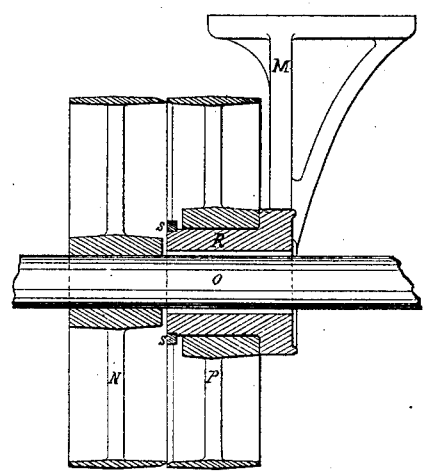

The drawings represent two modes for attaining the same object. Figure 1 represents one mode. Fig. 2 represents another mode. Fig. 3 is a sectional view of Fig. 1 on the line C D. Fig. 4 is a sectional view of Fig. 2 on the line A, B, like letters in Fig. 1 and Fig. 3 also in Fig. 2 and Fig. 4 referring to like parts.

Reference being first had to Fig. 1 and Fig. 3, H represents the hanger. E a driving shaft. G a driving pulley fast to the shaft E. J, J a series of rollers or pulleys revolving upon their respective axis K K a series of bolts passing through the hanger H. The bolts K K are made smaller and square or flat at the part passing through the hanger H thereby making a shoulder, which together with a nut L on the end of the bolt secures it firmly to the hanger H. The peripheries of the rollers or pulleys J J are adjusted to the periphery of the driving pulley G. The length of the arc of the hanger H, and the number of rollers or pulleys being governed by the bearing that a belt would have upon the driving pulley G. Now by moving a belt from the driving pulleys G to the rollers or pulleys J J a lathe or other machine attached to the pulley G is instantly detached and has no connection with the moving machinery.

Reference now being had to Fig. 2 and Fig. 4 as showing another mode, M, R represents a hanger, P a loose pulley. O a shaft, N a driving pulley fast to the shaft O. The hanger M R is constructed so as to let the shaft O pass through the part R without being connected while at the same time the part R forms an axis or journal for the loose pulley P to revolve upon. S is a collar put upon the journal R to keep the loose pulley P to its place. Now by moving a belt from the driving pulley N to the loose pulley P a lathe or other machine attached to the driving pulley N, is instantly detached and has no connection with the moving machinery.

The loose pulley P may be thrown in motion by means of friction at the peripheries of the driving pulley N and loose pulley P and a lever to throw them together when passing the belt from one to the other, but this arrangement I do not claim as a part of my invention. Or motion may be given to the loose pulley P by any known method. Then again a hanger bearing a driving shaft may be constructed with an axis independent of the shaft for a loose pulley, which I also claim as part of my invention.

I do not confine myself to the shape of the hangers for they require to be formed of different shapes according to the place to which they are to be suspended and the direction in which a lathe or other machine may stand from the driven shaft. Nor do I confine myself to the material of which any part is to be made.

What I claim as my invention and desire to secure by Letters Patent is—

A loose or suspension pulley or pulleys and hanger having an axis whereby a loose pulley may revolve independent of the shaft.

Witness my hand and seal this nineteenth day of January A D eighteen hundred and fifty four.

WILLIAM CAMPBELL. [L. S.]

Witnesses:
DAVIS EAVENSON,
SOLOMON HUMPHREYS.